(12) United States Patent  
Xiao et al.

(10) Patent No.: US 9,531,004 B2  
(45) Date of Patent: Dec. 27, 2016

(54) MULTIFUNCTIONAL HYBRID COATINGS FOR ELECTRODES MADE BY ATOMIC LAYER DEPOSITION TECHNIQUES

(71) Applicant: GM Global Technology Operations LLC, Detroit, MI (US)

(72) Inventors: Xingcheng Xiao, Troy, MI (US); Mark W. Verbrugge, Troy, MI (US); John S. Wang, Los Angeles, CA (US)

(73) Assignee: GM Global Technology Operations LLC, Detroit, MI (US)

(*) Notice: Subject to any disclaimer, the term of this patent is extended or adjusted under 35 U.S.C. 154(b) by 82 days.

(21) Appl. No.: 14/138,267

(22) Filed: Dec. 23, 2013

(65) Prior Publication Data

US 2015/0180023 A1 Jun. 25, 2015

(51) Int. Cl.
*H01M 4/36* (2006.01)
*H01M 4/485* (2010.01)
(Continued)

(52) U.S. Cl.
CPC .......... *H01M 4/366* (2013.01); *H01M 4/0402* (2013.01); *H01M 4/0423* (2013.01);
(Continued)

(58) Field of Classification Search
None
See application file for complete search history.

(56) References Cited

U.S. PATENT DOCUMENTS

| 6,451,487 | B1 | 9/2002 | Besner et al. |
| 7,018,607 | B2 | 3/2006 | Nazri et al. |

(Continued)

FOREIGN PATENT DOCUMENTS

| CN | 101107746 A | 1/2008 |
| CN | 101385163 A | 3/2009 |

(Continued)

OTHER PUBLICATIONS

Aurbach, Doron, et al., "Design of electrolyte solutions for Li and Li-ion batteries: a review," Electrochimica Acta, vol. 50, pp. 247-254 (2004) (published online Aug. 3, 2004).

(Continued)

*Primary Examiner* — Patrick Ryan
*Assistant Examiner* — Wyatt McConnell
(74) *Attorney, Agent, or Firm* — Harness, Dickey & Pierce, P.L.C.

(57) ABSTRACT

An electroactive material for use in an electrochemical cell, like a lithium ion battery, is provided. The electroactive material comprises a multifunctional hybrid protective coating system formed over an electroactive material. The coating system includes a first oxide-based coating disposed on one or more surfaces of the electroactive material, followed by a second coating deposited via a non-aqueous process. The second coating may be a fluoride-based, nitride-based, or carbide-based coating. The first and second coatings may be applied by atomic layer deposition (ALD) to form conformal ultrathin layers over the electroactive materials. Such a multifunctional hybrid protective coating system can suppress formation of gases within the electrochemical cell and also minimize formation of solid electrolyte interface (SEI) layers on the electrode to improve battery performance. Methods for making such materials and using such materials in electrochemical cells are likewise provided.

20 Claims, 6 Drawing Sheets

(51) Int. Cl.
*H01M 4/48* (2010.01)
*H01M 4/04* (2006.01)
*H01M 4/58* (2010.01)
*H01M 4/62* (2006.01)
*H01M 10/0525* (2010.01)
*H01M 4/583* (2010.01)

(52) U.S. Cl.
CPC ........... *H01M 4/0428* (2013.01); *H01M 4/48* (2013.01); *H01M 4/485* (2013.01); *H01M 4/582* (2013.01); *H01M 4/622* (2013.01); *H01M 4/625* (2013.01); *H01M 10/0525* (2013.01); *H01M 4/583* (2013.01); *Y02E 60/122* (2013.01); *Y02P 70/54* (2015.11)

(56) References Cited

U.S. PATENT DOCUMENTS

| | | |
|---|---|---|
| 7,285,260 B2 | 10/2007 | Armand et al. |
| 7,457,018 B2 | 11/2008 | Armand et al. |
| 7,491,467 B2 | 2/2009 | Satoh et al. |
| 7,651,732 B2 | 1/2010 | Cheng et al. |
| 7,722,994 B2 | 5/2010 | Halalay |
| 7,736,805 B2 | 6/2010 | Nazri et al. |
| 8,076,027 B2 | 12/2011 | Honda et al. |
| 8,101,152 B1 | 1/2012 | Halalay et al. |
| 8,148,455 B2 | 4/2012 | Posudievsky et al. |
| 8,247,116 B2 | 8/2012 | He et al. |
| 8,309,644 B1 | 11/2012 | Huang |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,641,860 B2 | 2/2014 | Flores et al. |
| 8,974,946 B2 | 3/2015 | Cai et al. |
| 8,999,584 B2 | 4/2015 | Jiang et al. |
| 9,034,519 B2 | 5/2015 | Xiao et al. |
| 9,059,451 B2 | 6/2015 | Xiao et al. |
| 9,093,705 B2 | 7/2015 | Xiao et al. |
| 9,123,939 B2 | 9/2015 | Xiao et al. |
| 9,160,036 B2 | 10/2015 | Yang et al. |
| 2006/0147797 A1 | 7/2006 | Wu et al. |
| 2007/0202411 A1 | 8/2007 | Kim et al. |
| 2007/0238023 A1 | 10/2007 | Gorshkov et al. |
| 2007/0275302 A1* | 11/2007 | Sotowa ............... H01M 4/0433 429/217 |
| 2008/0063939 A1 | 3/2008 | Ryu et al. |
| 2008/0226987 A1 | 9/2008 | Yumoto et al. |
| 2008/0261116 A1 | 10/2008 | Burton et al. |
| 2009/0111031 A1 | 4/2009 | Hirose et al. |
| 2009/0136415 A1 | 5/2009 | Gorshkov et al. |
| 2009/0140742 A1 | 6/2009 | Koch et al. |
| 2009/0155697 A1* | 6/2009 | Park et al. ............... 429/339 |
| 2009/0253042 A1 | 10/2009 | Sun et al. |
| 2009/0286157 A1* | 11/2009 | Chen .................. H01M 4/0416 429/209 |
| 2009/0325071 A1 | 12/2009 | Verbrugge et al. |
| 2010/0079145 A1 | 4/2010 | Meisner et al. |
| 2010/0143790 A1 | 6/2010 | Inagaki et al. |
| 2010/0203392 A1 | 8/2010 | Yamada et al. |
| 2010/0272612 A1 | 10/2010 | Ramamurthy |
| 2010/0330421 A1 | 12/2010 | Cui et al. |
| 2011/0017528 A1 | 1/2011 | Kumar et al. |
| 2011/0027649 A1* | 2/2011 | Abe .................... H01M 4/0404 429/212 |
| 2011/0037436 A1* | 2/2011 | Seethaler et al. ............. 320/137 |
| 2011/0044886 A1 | 2/2011 | Gorshkov et al. |
| 2011/0086249 A1 | 4/2011 | Timmons |
| 2011/0086294 A1 | 4/2011 | Xiao et al. |
| 2011/0111294 A1 | 5/2011 | Lopez et al. |
| 2011/0111308 A1 | 5/2011 | Halalay et al. |
| 2011/0121225 A1 | 5/2011 | Posudievsky et al. |
| 2011/0151333 A1 | 6/2011 | Halalay et al. |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0224928 A1 | 9/2011 | Lin et al. |
| 2011/0250478 A1 | 10/2011 | Timmons et al. |
| 2011/0274962 A1* | 11/2011 | Inagaki et al. ................ 429/149 |
| 2012/0003533 A1 | 1/2012 | Dahn et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0208087 A1 | 8/2012 | Yamamoto et al. |
| 2012/0219852 A1 | 8/2012 | Huang et al. |
| 2012/0227252 A1 | 9/2012 | Nazri |
| 2012/0229096 A1 | 9/2012 | Nazri |
| 2012/0231321 A1 | 9/2012 | Huang et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1 | 7/2013 | Wang et al. |
| 2013/0183582 A1 | 7/2013 | Halalay et al. |
| 2013/0189576 A1 | 7/2013 | Verbrugge et al. |
| 2013/0224602 A1 | 8/2013 | Huang |
| 2013/0234674 A1 | 9/2013 | Nazri |
| 2013/0284338 A1 | 10/2013 | Xiao et al. |
| 2013/0319599 A1 | 12/2013 | Huang |
| 2013/0323595 A1 | 12/2013 | Sohn et al. |
| 2014/0011089 A1 | 1/2014 | Yamada et al. |
| 2014/0023931 A1 | 1/2014 | Huang |
| 2014/0038024 A1 | 2/2014 | Huang |
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2015/0014890 A1 | 1/2015 | Xiao |
| 2015/0037651 A1 | 2/2015 | Huang |
| 2015/0162602 A1 | 6/2015 | Dadheech et al. |
| 2015/0228980 A1 | 8/2015 | Huang |

FOREIGN PATENT DOCUMENTS

| | | |
|---|---|---|
| CN | 101728517 A | 6/2010 |
| CN | 101764209 A | 6/2010 |
| CN | 101986442 A | 3/2011 |
| CN | 102306748 A | 1/2012 |
| CN | 103779550 A | 5/2014 |
| CN | 103943819 A | 7/2014 |
| CN | 104701487 A | 6/2015 |
| DE | 102013220351 A1 | 4/2014 |
| WO | 2007094635 A1 | 8/2007 |

(56) References Cited

FOREIGN PATENT DOCUMENTS

| WO | 2012132396 A1 | 10/2012 |
|---|---|---|
| WO | 2014022986 A1 | 2/2014 |
| WO | 2014182281 A1 | 11/2014 |

OTHER PUBLICATIONS

Bai, Ying, et al., "Microstructure and electrochemical performances of LiF-coated spinel LiMn2O4," Transactions of Nonferrous Metals Society of China, vol. 17, pp. s892-s896 (2007).
Gaines, Linda, et al., "Costs of Lithium-Ion Batteries for Vehicles," Argonne National Laboratory, Center for Transportation Research (May 2000).
George, Steven M., "Atomic Layer Deposition: An Overview," Chem. Rev., vol. 110, No. 1, pp. 111-131 (2010) (published online Nov. 30, 2009).
Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).
Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).
Leskelä, Markku, et al., "Atomic layer deposition (ALD): from precursors to thin film structures," Thin Solid Films, vol. 409, pp. 138-146 (2002).
Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2 pages).
Qin, Yan, et al., "Mechanism of LTO Gassing and potential solutions," Argonne National Laboratory Presentation, May 9-13, 2011 (18 pages).
Ramadass, Premanand, et al., "Mathematical Modeling of SEI Formation in Li-Ion Cell Anodes," 202nd Meeting of The Electrochemical Society—Salt Lake City, UT, Oct. 20-25, 2002, (Abstract) (10 pages) (Oct. 23, 2002).
Vetter, J., et al., "Ageing mechanisms in lithium-ion batteries," J. Power Sources, vol. 147, Nos. 1-2, pp. 269-281 (Sep. 9, 2005).
Huntsman Corporation, JEFFAMINE® ED-2003 Polyetheramine Technical Bulletin, Form 5197-0208 (2007) (2 pages).
A First Office Action in Chinese App. No. 201410017174.9 from the State Intellectual Property Office dated Oct. 10, 2015; 12 pages.
Huntsman Corporation, Jeffamine.RTM. ED-2003 Polyetheramine Technical Bulletin, Form 5197-0208 (2007) (2 pages).
Franssila, Sami, Introduction to Microfabrication, Second Ed., p. 53 (2010).
A Second Office Action in Chinese Application No. 201310489603.8 from the State Intellectual Property Office (SIPO) mailed May 22, 2016, and correspondence from China Patent Agent (H.K.) summarizing the Second Office Action; 11 pages.
A First Office Action in Chinese Application No. 201310489603.8 from the State Intellectual Property Office (SIPO) mailed Jul. 31, 2015, and correspondence from China Patent Agent (H.K.) summarizing the First Office Action; 12 pages.
A First Office Action in Chinese Application No. 201410750591.4 from the Chinese Patent Office issued Jul. 5, 2016 and correspondence from China Patent Agent (H.K.) summarizing the First Office Action; 9 pages.

\* cited by examiner

MULTIFUNCTIONAL HYBRID COATINGS FOR ELECTRODES MADE BY ATOMIC LAYER DEPOSITION TECHNIQUES

FIELD

The present disclosure relates to surface coatings for electrodes for use in electrochemical devices, and more particularly to ultrathin multifunctional hybrid protective coating systems for electrode materials which suppress undesirable side reactions, minimize the formation of solid electrolyte interphase (SEI) on the electrode surface and/or minimize or suppress gas generation for use in electrochemical devices. The present disclosure also provides methods for making such coatings and for use thereof.

BACKGROUND

This section provides background information related to the present disclosure which is not necessarily prior art.

High-energy density electrochemical cells, such as lithium ion batteries, can be used in a variety of consumer products and vehicles. Typical lithium ion batteries comprise a first electrode, such as a cathode (positive electrode), a second electrode such as an anode (negative electrode), an electrolyte material, and a separator. Often a stack of lithium ion battery cells is electrically connected to increase overall output. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a positive electrode to a negative electrode during charging of the battery, and in the opposite direction when discharging the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create these components for a lithium ion battery. By way of non-limiting example, cathode materials for lithium batteries typically comprise an electroactive material which can be intercalated with lithium ions, such as lithium-transition metal oxides or mixed oxides of the spinel type, for example $LiCoO_2$, $LiMn_2O_4$, $LiNiO_2$, $LiNi_{(1-x-y)}Co_xM_yO_2$ (where 0<x<1, y<1, and M may be Al, Mn, or the like), or lithium metal (e.g., iron) phosphates. The electrolyte typically contains one or more lithium salts, which may be dissolved and ionized in a non-aqueous solvent. The negative electrode typically includes a lithium insertion material or an alloy host material. Typical electroactive materials for forming an anode include lithium-graphite intercalation compounds, lithium-silicon intercalation compounds, lithium alloys and lithium titanate $Li_{4+x}Ti_5O_{12}$, where $0 \le x \le 3$, such as $Li_4Ti_5O_{12}$ (LTO), which may be a nano-structured LTO. Contact of the anode and cathode materials with the electrolyte can create an electrical potential between the electrodes. When electron current is generated in an external circuit between the electrodes, the potential is sustained by electrochemical reactions within the cells of the battery.

Li-ion batteries can suffer from capacity fade attributable to many factors, including mechanical degradation from volume expansion during lithium intercalation or from the continuous formation of a passive film, known as the solid electrolyte interface (SEI) layer, over the surface of the negative electrode (anode), which is often generated by reaction products of anode material, electrolyte reduction, and/or lithium ion reduction. The SEI layer formation plays a significant role in determining electrode behavior and properties including cycle life, irreversible capacity loss, high current efficiency, and high rate capabilities, particularly advantageous for power battery and start-stop battery use.

Moreover, certain anode materials, like LTO, have particular advantages, such as high operating voltage relative to a lithium metal reference potential that desirably minimizes or avoids SEI formation. LTO is also a zero-strain material having minimal volumetric change during lithium insertion and deinsertion, thus enabling long term cycling stability, high current efficiency, and high rate capabilities. Such long term cycling stability, high current efficiency, and high rate capabilities are particularly advantageous for power battery and start-stop battery use.

However, while LTO and other materials may be promising anode materials for high power lithium ion batteries, potentially providing extremely long life and exceptional tolerance to overcharge and thermal abuse, in certain circumstances, when used with certain cathode materials and electrolytes, LTO may have certain disadvantages. For example, it has been observed that $Li_{4+x}Ti_5O_{12}$ can generate significant quantities of gas, which mainly consists of hydrogen, within a battery cell especially at elevated temperature conditions under charging state. Such gas formation can make it an undesirable choice for commercial use. For safe and successful use, it would be desirable to improve various anode materials, like LTO, either to minimize formation of SEI layers and/or to minimize or suppress gas formation, to provide durable batteries with sustained high capacity, high discharge rates, and long life.

SUMMARY

This section provides a general summary of the disclosure, and is not a comprehensive disclosure of its full scope or all of its features.

In certain aspects, the present disclosure provides an electrode for an electrochemical cell that comprises an electroactive material. The electroactive material has a multifunctional hybrid coating system disposed on one or more surface regions. For example, the electrode may optionally comprise a first oxide-based coating formed on one or more surface regions of the electroactive material and a second coating disposed over the first oxide-based coating. The second coating is distinct from the first oxide-based coating and is formed from a non-aqueous coating process. In certain variations, the second coating is selected from the group consisting of: a fluoride-based coating, a carbide-based coating, and a nitride-based coating. Such an electrode may be incorporated into a lithium ion electrochemical cell as a negative electrode.

In other aspects, the present disclosure provides a method of making an electrode for an electrochemical cell. The method comprises applying a first oxide-based coating via a deposition process to one or more surface regions of an electroactive material. The method also comprises applying a second coating over the first oxide-based coating via a non-aqueous coating process. The second coating is selected from the group consisting of: a fluoride-based coating, a carbide-based coating, and a nitride-based coating.

In yet other aspects, the present disclosure provides a method of improving performance in a lithium ion battery. The method may comprise applying a multifunctional hybrid coating system to an electroactive material used in a first electrode in the lithium ion battery. The multifunctional hybrid coating system comprises an oxide-based coating adjacent to the electroactive material and a fluoride-based coating disposed thereon, where the lithium ion battery further comprises a second electrode having an opposite polarity from the first electrode, a separator, and an electrolyte, and any of the electroactive material exposed to the electrolyte has the multifunctional hybrid coating system formed thereon. In certain variations, the electrode is a negative electrode and the electroactive material is selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
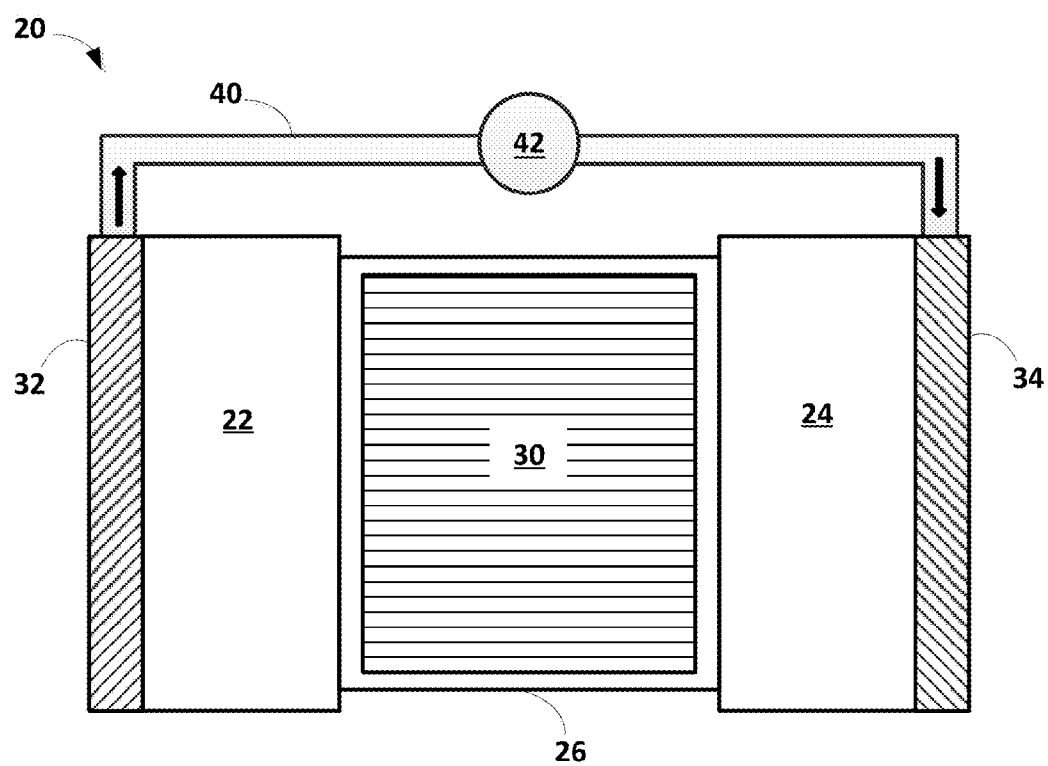
FIG. 1 is a schematic of an exemplary electrochemical battery for purposes of illustration.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

As used herein, the terms "composition" and "material" are used interchangeably to refer broadly to a substance containing at least the preferred chemical compound, but which may also comprise additional substances or compounds, including impurities.

The present technology pertains to improved electrochemical cells, especially lithium ion batteries, which may be used in vehicle applications. An exemplary and schematic illustration of a lithium ion battery 20 is shown in FIG. 1. Example embodiments will now be described more fully with reference to the accompanying drawings. An exemplary and schematic illustration of a lithium ion battery 20 is shown in FIG. 1. Lithium ion battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20.

The lithium ion battery 20 can generate an electric current during discharge by way of reversible electrochemical reactions that occur when the external circuit 40 is closed (to connect the negative electrode 22 and the positive electrode 34) and the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated lithium in the negative electrode 22 is depleted and the capacity of the lithium ion battery 20 is diminished.

The lithium ion battery 20 can be charged or re-powered at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator. In many lithium ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium ion battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium ion battery 20 may vary depending on the particular application for which it is designed. Battery-powered vehicles and hand-held consumer electronic devices, for example, are two examples where the lithium ion battery 20 would most likely be designed to different size, capacity, and power-output specifications. The lithium ion battery 20 may also be connected in series or parallel with other similar lithium ion cells or batteries to produce a greater voltage output and power density if it is required by the load device 42.

Accordingly, the lithium ion battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium ion battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or a wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

The positive electrode 24 may be formed from any lithium-based active material that can sufficiently undergo lithium intercalation and deintercalation, while functioning as the positive terminal of the lithium ion battery 20. The positive electrode 24 may include a polymeric binder material to structurally fortify the lithium-based active material. One exemplary common class of known materials that can be used to form the positive electrode 24 is layered lithium transitional metal oxides. For example, in various embodiments, the positive electrode 24 may comprise at least one spinel, like lithium manganese oxide ($Li_{(1+x)}Mn_{(2-x)}O_4$), where 0≤x≤1, where x is typically less than 0.15, including $LiMn_2O_4$, lithium manganese nickel oxide, ($LiMn_{(2-x)}Ni_xO_4$), where 0≤x≤1 and, e.g., $LiMn_{1.5}Ni_{0.5}O_4$, lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where 0≤x≤1, 0≤y≤1, 0≤z≤1, and x+y+z=1, a lithium nickel cobalt metal oxide $LiNi_{(1-x-y)}Co_xM_yO_2$ (wherein 0<x<1, y<1, and M may be Al, Mn, or the like), lithium-transition metal oxides or mixed oxides lithium iron phosphates, or a lithium iron polyanion oxide such as lithium metal phosphates (e.g., $LiFePO_4$) or lithium metal fluorophosphates (e.g., $Li_2FePO_4F$). A variety of other known lithium-based active materials may also be used. By way of non-limiting example, alternative materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide, ($LiMn_{(2-x)}Ni_xO_4$), where 0≤x≤1, lithium manganese nickel cobalt oxide, (e.g., $LiMn_{1/3}Ni_{1/3}Co_{1/3}O_2$), or lithium iron phosphate ($LiFePO_6$). Such active materials may be intermingled with at least one polymeric binder, for example, by slurry casting the electroactive materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium ion battery. The negative electrode 22 may also include another electrically conductive material, as well as one or more polymeric binder materials to structurally hold the lithium host material together. For example, in certain embodiments, the negative electrode 22 may comprise lithium titanate oxide $Li_4Ti_5O_{12}$ (LTO), graphite, silicon, silicon-containing alloys, tin-containing alloys, and combinations thereof.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Any of these negative electroactive materials may of course be combined with other electroactive materials.

In one variation, the negative electrode 22 may be formed from lithium titanate oxide (LTO) particles intermingled in at least one of polyvinylidene fluoride (PVDF), a nitrile butadiene rubber (NBR), styrene-butadiene rubber (SBR) binder, or carboxymethoxyl cellulose (CMC) as will be discussed in greater detail below, by way of non-limiting example. The negative electrode current collector 32 may be formed from copper or any other appropriate electrically conductive material known to those of skill in the art.

In certain aspects of the present disclosure, the negative electrode 22 comprises an electroactive material modified in accordance with certain principles of the present teachings. Notably, in alternative variations, the electroactive material used for the positive electrode 24 may also be modified in accordance with certain principles of the present teachings. The electroactive material has a multifunctional hybrid protective coating system applied to one or more surface regions of the electroactive material. A first coating is formed on one or more surface regions of the electroactive material. In certain variations, the first coating is an oxide-based coating that may have be ultrathin. A second coating is disposed over the first oxide-based coating. The second coating is distinct from the first oxide-based coating and is formed from a non-aqueous coating process. In certain variations, the second coating likewise has an ultrathin thickness. In this regard, the present disclosure provides a simple low cost process to create electrode materials with multiple functions to improve cycling stability and extend battery life, inter alia. For example, the hybrid coating system is capable of mitigating mechanical degradation of the electrode by use of a surface coating with good mechanical strength, while also mitigating any potential chemical degradation, such as gas generation, by employing a surface coating with good chemical stability against electrolyte.

Thus, the electrode material for forming an electrode, such as negative electrode 22, may comprise a first coating formed on one or more surface regions of the electroactive material. The first coating may be an oxide-based coating. A second coating is disposed over the first oxide-based coating. The second coating is distinct from the first oxide-based coating. In certain preferred aspects, the second coating is formed from a non-aqueous coating process. In certain variations, the second surface coating disposed over the first oxide-based coating comprises a fluoride-based coating, a carbide-based coating, and/or a nitride-based coating, as will be discussed in more detail below.

In certain variations, the first oxide-based coating and the second coating applied to the electrode material are both ultrathin. In certain aspects, the applied surface coatings are ultra-thin having a thickness of less than or equal to about 100 nm, optionally less than or equal to about 90 nm, optionally less than or equal to about 80 nm, optionally less than or equal to about 70 nm, optionally less than or equal to about 60 nm, optionally less than or equal to about 50 nm, optionally less than or equal to about 40 nm, optionally less than or equal to about 30 nm, optionally less than or equal to about 20 nm, optionally less than or equal to about 15 nm, optionally less than or equal to about 10 nm, and in certain variations, optionally less than or equal to about 5 nm.

In certain variations, a thickness of the oxide-based coating applied to the electroactive material is less than or equal to about 50 nm, optionally less than or equal to about 40 nm, optionally less than or equal to about 30 nm, optionally less than or equal to about 20 nm, optionally less than or equal to about 15 nm, optionally less than or equal to about 10 nm, and in certain variations, optionally less than or equal to about 5 nm. Likewise, in certain variations a thickness of the second coating is less than or equal to about 50 nm, optionally less than or equal to about 40 nm, optionally less than or equal to about 30 nm, optionally less than or equal to about 20 nm, optionally less than or equal to about 15 nm, optionally less than or equal to about 10 nm, optionally less than or equal to about 5 nm, and in certain variations, optionally less than or equal to about 3 nm. In certain variations, the first oxide-based coating has a thickness of less than or equal to about 5 nm and the second coating has a thickness of less than or equal to about 50 nm.

In certain embodiments, a thickness of the oxide-based coating is less than or equal to about 15 nm, optionally less than or equal to about 10 nm, optionally less than or equal to about 5 nm, optionally less than or equal to about 4 nm, optionally less than or equal to about 3 nm, and optionally than or equal to about 2 nm, while a thickness of the second coating is less than or equal to about 5 nm, optionally less than or equal to about 4 nm, optionally less than or equal to about 2 nm, optionally less than or equal to about 1 nm, and optionally than or equal to about 0.5 nm.

In certain aspects, the teachings of the present disclosure are particularly suitable for use with a negative electroactive material comprising $Li_4Ti_5O_{12}$ (LTO). LTO is capable of sufficiently undergoing lithium intercalation and deintercalation, while functioning as the negative terminal of the lithium ion battery 20. When LTO is intercalated with lithium ions, it transitions from $Li_4Ti_5O_{12}$ to $Li_{4+x}Ti_5O_{12}$, where x ranges from $0 \leq x \leq 3$ (where LTO in a fully intercalated form is $Li_7Ti_5O_{12}$). As discussed previously, LTO is particularly useful as a negative electrode 22 active material, because it has outstanding electrochemical performance and furthermore has little to no volumetric change after lithium insertion. Thus, it is considered a zero-strain material providing superior long term stability.

Hence, LTO is a promising electrode material for lithium battery, due to its excellent cycling stability, current efficiency, rate capability. Furthermore, LTO can be designed as a nano-structured material for higher packing density and very high rate capacities. However, as discussed previously, one potential shortcoming to using LTO as a negative electrode 22 is that it appears that over time and at relatively high temperatures, LTO can generate significant amounts of gas. As lithium ion cells are typically hermetically sealed, such gas generation over time is undesirable. The predominant component in the gas generated by LTO in a lithium ion battery is hydrogen ($H_2$), the generation of which appears to increase with temperature and state of charge (SoC). LTO and the typical active materials for cathodes (e.g., $Li_{(1+x)}Mn_{(2-x)}O_4$) do not themselves contain a source of hydrogen and thus do not by themselves generate hydrogen. Furthermore, while lithium electrolytes have a source of hydrogen (e.g., from non-aqueous solvents, like alkyl carbonates), the electrolytes are typically stable at ambient temperatures. Furthermore, the issue of gas generation seems to be specific to use of LTO or similar materials as negative electrode active materials, while changing the cathode active materials does not mitigate generation of the gas.

Figure 2:
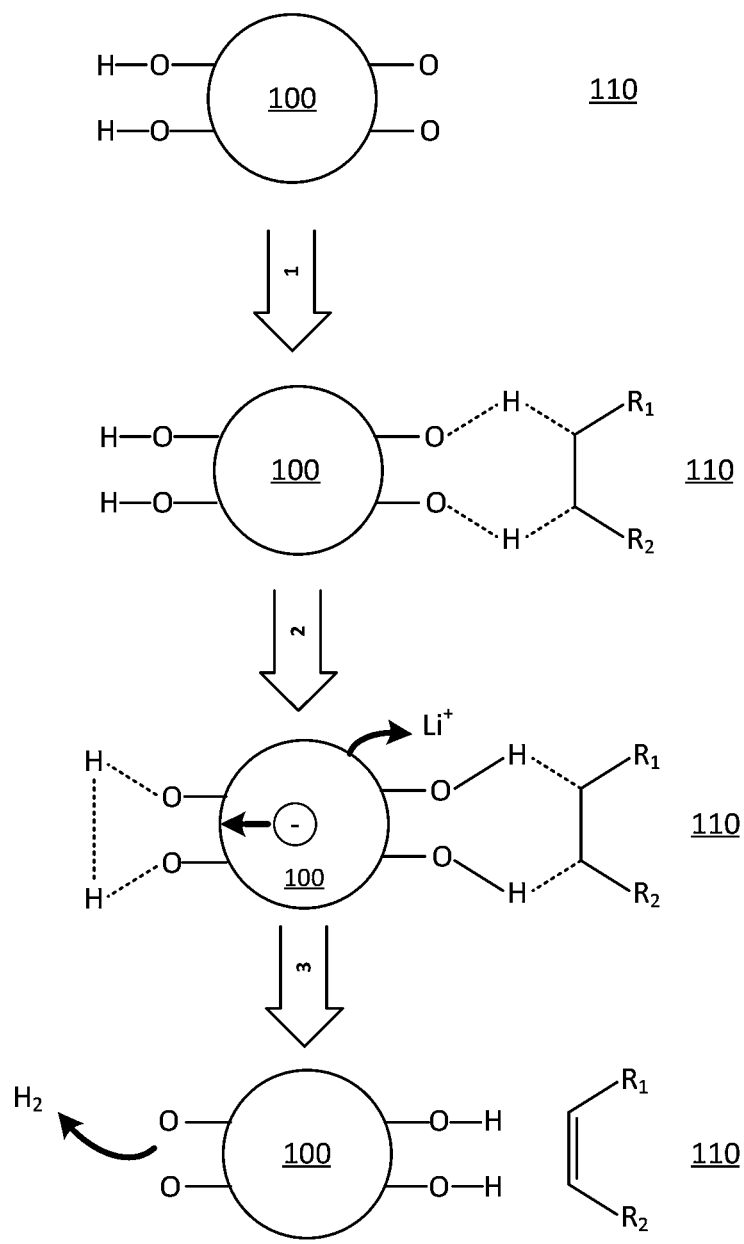
FIG. 2 is an exemplary schematic showing a theorized mechanism of gas generation by solvent adsorption on lithium titanate oxide electroactive materials in a lithium ion electrochemical cell.

While not limiting the present teachings to any particular theory, it is theorized that solvents, such as alkyl carbonates in the electrolyte solution (by way of non-limiting example, ethylene carbonate (EC), diethyl carbonate (DEC), and ethylmethylcarbonate (EMC)) provide a source of hydrogen via the carbonates. Thus, it is theorized that the active metal oxides (LTO) may adsorb such solvents and/or act as a catalyst to promote chemical or electrochemical decomposition of the hydrogen source(s) from the electrolyte, thus forming hydrogen gas and other undesirable byproducts. As background, an exemplary mechanism is shown in FIG. 2 for what is believed to be a mechanism for hydrogen gas generation with LTO electrodes based upon Qin et al., Mechanism of LTO Gassing and Potential Solutions, Argonne National Laboratory (May 9-13, 2011), the relevant portions of which are incorporated herein by reference.

An exemplary particle of $Li_{(4+x)}Ti_5O_{12}$, where $0 \leq x \leq 3$ (LTO) particle is shown as 100. Adjacent or nearby to the particle is electrolyte 110. As noted above, in addition to lithium salts, conventional electrolyte 110 solutions also comprise solvents, such as alkyl carbonates. Thus, the electrolyte 110 comprises a solvent or hydrogen source. After arrow 1, such a solvent species is shown adsorbed to a surface of the LTO 100. After arrow 2, a hydroxyl group is reduced and a lithium ion is released. This causes hydrogen gas to be released and chemical decomposition of the solvent (shown as $R_1C=CR_2$), where the LTO 100 may serve as a catalyst for such reactions to occur. Overall, gas generation is thus theorized to come from chemical reduction of —OH groups on $Li_7Ti_5O_{12}$ with assistance of the solvent in the electrolyte. Suppression of such gas generated from LTO can further improve the safety and life of lithium ion batteries.

Thus, in accordance with various aspects of the present teachings, the negative anode material, which otherwise generates gas within an electrochemical cell, comprises a protective surface coating comprising two distinct compositions that serves to reduce or eliminates generation of gases by consuming or binding —OH groups and therefore suppressing or minimizing any adverse side reactions with species present in the electrolyte or battery cell. While the present teachings are primarily directed to lithium titanate oxide (LTO), the principles of using surface coatings to suppress gas formation may be used in conjunction with any other electroactive materials that undesirably generate gases within an electrochemical cell or battery.

Moreover, in addition to suppressing gas formation, protective surface coatings prepared in accordance with the present teachings are also useful for other negative electrode active materials, in that the protective surface coatings according to the present disclosure can minimize or eliminate formation of solid electrolyte interface (SEI) layers on the exposed surfaces of the electroactive materials. Such a protective surface coating system minimizes or prevents deposition of transition metals or other compounds present within the electrochemical cell onto the surface of graphite or another negative electrode material, which may beneficially avoid charge capacity fade to substantially maintain the charge capacity of the electrochemical cell. For example, transition metals or other compounds present within the positive electrode may migrate through the electrochemical cell as ions to the negative electrode and react or deposit on a surface thereof via a reduction reaction to form an SEI layer, for example. In avoiding or minimizing formation the formation of an SEI layer on the electroactive material, the inventive protective coating system can reduce irreversible capacity loss in electrochemical cells that can occur when SEI layers are formed.

In certain aspects, the present disclosure provides methods for making an electroactive material for an electrochemical cell that comprises applying a surface coating system to an electroactive or electrode material. In certain variations, the electrode material comprises a negative electrode active material selected from the group consisting of: $Li_{(4+x)}Ti_5O_{12}$, where $0 \leq x \leq 3$ (LTO), graphite, silicon, silicon-containing alloys, tin-containing alloys, and combinations thereof. The surface coating system comprises two compositionally distinct surface coatings applied sequentially over one or more surface regions of the electroactive material. The surface coating may be applied to any region of a surface of the electrode material that may be exposed to electrolyte or solvent within the electrochemical cell to minimize deposition, adsorption, or reaction of chemical species. Notably, multiple layers having the same surface coating composition may be applied to form the desired surface coating. In certain aspects, the surface coatings applied to the electroactive material are ultrathin within the dimensions described above. The surface coatings may be electronically insulating coatings.

Thus, in accordance with certain aspects of the present disclosure, an inventive protective coating system for an electrode (e.g., anode) material comprises an electroactive material having one or more surface regions coated with a first oxide-based coating. By "oxide-based" coating, it is meant that the coating comprises oxygen and is applied with precursors that form an oxygen-containing coating, but such precursors may further react with reactive groups on the surface of the electroactive material to form hybridized compounds. In certain variations, the oxide-based coating comprises an oxide of a metal selected from the group consisting of: titanium (Ti), aluminum (Al), tin (Sn), zirconium (Zr), vanadium (V), hafnium (Hf), zinc (Zn) and combinations thereof. In other variations, the coating may be an oxide-based surface coating selected from the group consisting of: aluminum oxide ($Al_2O_3$), silicon dioxide ($SiO_2$), vanadium pentoxide ($V_2O_5$), titanium dioxide ($TiO_2$), zirconium dioxide ($ZrO_2$), hafnium dioxide ($HfO_2$) and zinc oxide (ZnO). It should be noted that the amount of oxygen might vary in the metal oxide coating, as desired, so that an aluminum oxide may not necessarily be stoichiometrically aluminum oxide ($Al_2O_3$) and the like. Such oxide-based surface coatings may be formed by using one or more precursors for aluminum oxide ($Al_2O_3$), silicon dioxide ($SiO_2$), vanadium pentoxide ($V_2O_5$), titanium dioxide ($TiO_2$), zirconium dioxide ($ZrO_2$), hafnium dioxide ($HfO_2$) and/or zinc oxide (ZnO). The oxide-based surface coating is selected from the group consisting of: aluminum oxide ($Al_2O_3$), titanium oxide ($TiO_2$), zinc oxide (ZnO) and silicon oxide ($SiO_2$), in certain variations. In certain variations, the oxide-based surface coating comprises aluminum oxide ($Al_2O_3$). Such an oxide-based surface coating may be formed by using one or more precursors for an aluminum oxide ($Al_2O_3$) coating, as will be further described herein.

A second coating having a distinct composition is disposed over the first oxide-based coating. The second coating is desirably formed from a non-aqueous coating process, to avoid formation of active hydrogen and hydroxyl groups at the coated surface. The second surface coating disposed over the first oxide-based coating optionally comprises a fluoride-based coating, a carbide-based coating, and/or a nitride-based coating. In certain variations, the second coating is a fluoride-based coating.

In accordance with certain aspects of the present disclosure, it is believed that the first oxide-based surface coating deposited onto the surface of electrodes or electroactive particles provides mechanical protection from the volume change that can occur during lithium ion battery cycling, because the oxide-based coating has a higher elastic modulus and fracture strength. Additionally, Li transport through the oxide layer can lead to structural change, which can facilitate the interfacial charge transfer between oxide layer and LTO. The second coating, for example, an ultrathin fluoride layer, disposed over the oxide-based surface coating provides chemical protection from the chemical side reactions with the electrolyte or other components within the electrochemical cell. Thus, the protective surface coating system for an electrode material comprising the oxide-based surface coating and the second coating formed by non-aqueous deposition process provides capability of suppressing gas generation within the electrochemical cell and also, can reduce or avoid formation of a solid electrolyte interface (SEI) layer that can cause irreversible capacity fading in a lithium ion battery.

In certain variations, a surface coating on the electroactive material (e.g., anode electroactive material) which can suppress gas formation comprises fluorine and is a fluoride-based coating. By "fluoride-based" coating, it is meant that the coating is applied with precursors to form a fluoride-containing coating, but such precursors may further react with reactive groups on the surface of the lithium titanate to form hybridized compounds. As many reactive groups on the lithium titanate and other negative electroactive materials are reactive hydrogen or hydroxyl groups, oxygen-containing species may likewise be formed.

Applying such a thin fluoride-based surface coating on an LTO electrode or LTO particles causes a reaction with the oxide-based surface coating and consumes all of —OH functional groups, which are believed to be responsible for the gas generation. Further, the second fluoride-based coating can protect underlying regions of the electroactive material that may react with components within the electrochemical cell which are responsible for the gas generation (e.g., electrolyte), especially for generation of hydrogen gas ($H_2$). As many reactive groups on the lithium titanate or other electroactive materials are reactive hydrogen or hydroxyl groups, oxygen-containing species may likewise be formed. The fluoride-based coating can avoid or eliminate active groups terminated on either the oxide-based coating and/or the LTO surface (which are presumed to be responsible for most of the gas generation from LTO under charging state), and prevent lithium ion self-discharge from LTO. Such a concept similarly applies to carbide-based and nitride-based coatings, which may likewise contain oxygen-containing species. Such a second surface coating formed by a non-aqueous process within the hybrid protective coating system of the present disclosure can thus significantly suppress or eliminate gas generation.

In certain variations, the surface coating is formed from a precursor (or one or more precursors) for an aluminum fluoride ($AlF_3$) coating, a lithium fluoride (LiF) coating, or combinations thereof. Such a fluoride-based coating may be formed with one or more precursors for forming an LiF coating that when reacted with the oxide-based coating surface groups form an oxyfluoride-containing coating, which comprises various oxygen containing species, such as $Li_2O$ in addition to LiF. In other variations, a fluoride-based coating may be formed with a precursor for an $AlF_3$ coating, which when reacted with surface groups of the LTO similarly forms an oxyfluoride-containing coating having various oxygen containing species, such as $Li_2O$ in addition to $AlF_3$.

In certain aspects, the present disclosure contemplates methods of making electrodes for an electrochemical cell. Such a method may comprise applying a first oxide-based coating via a deposition process to one or more surface regions of an electrode material. The method also comprises applying a second coating over the first oxide-based coating via a non-aqueous coating process. The second coating is selected from the group consisting of: a fluoride-based coating, a carbide-based coating, and a nitride-based coating.

In various aspects, the respective surface coatings are applied to an electrode material by a deposition process. For example, suitable deposition processes include atomic layer deposition (ALD), physical vapor deposition (PVD), chemical vapor deposition (CVD), chemical vapor infiltration, wet chemistry, and sol-gel processes. Where the applying process is to form the second coating over the first oxide-based coating, it is preferred that it is a non-aqueous coating process. Thus, the non-aqueous coating process for applying the second coating may be selected from the group consisting of: atomic layer deposition (ALD), physical vapor deposition (PVD), chemical vapor deposition (CVD), chemical vapor infiltration, non-aqueous wet chemistry, and non-aqueous sol-gel. In certain aspects, the surface coating may be applied in a first process by an atomic layer deposition (ALD) process that can coat the electrode material, such as LTO or graphite, with a conformal layer that comprises the oxide-based layer, such as aluminum oxide ($Al_2O_3$). ALD is a self-limiting process for chemical deposition or growth of ultrathin films on a substrate. ALD typically involves subjecting the target substrate to self-saturating surface reactions. The surface reactions may be conducted sequentially and/or in an alternating fashion, depending on the composition and structure of the film desired.

ALD is typically conducted in an apparatus having a vacuum deposition chamber with a holder for the substrate or two rotating axles for roll-to-roll process in large-scale production, at least one vapor source (known as the precursor) and various controls by which the substrate may be individually subjected to the vapor source. Such controls may include heaters, coolers, flow routing and valves, for controlling the amount of exposure of the substrate to the vapor source. The regions of the electrode material to be coated may be pre-treated, for example, by plasma treatment. The ALD process for deposition of surface coating onto regions of the electrode material involves reaction of the surface in a deposition chamber with a single vapor of precursor materials or reaction of the surface with multiple vapors introduced sequentially and having the precursors of the surface coating. Suitable precursors may include organic and inorganic metallic compounds, such as trimethylaluminum (TMA). The vapor may be pulsed into the vacuum deposition chamber on a carrier gas and may be quickly purged, for example, by vacuum pumping or flushing with an inert gas. Such pulsing of the vapor and purging of the system may be performed to control the dose of the precursor vapor to which the substrate is exposed.

Generally, the ALD process is performed at elevated temperatures and reduced pressures. Temperature within the deposition chamber is desirably high enough that reaction between the substrate and the precursors in the vapor occurs, while also preventing condensation of the vapor onto the surface. As non-limiting examples, the reaction space in the deposition chamber may have a temperature of room temperature (e.g., approximately 21° C.) to about 200° C. (for depositing coating directly on electrode) or may be heated to a temperature of room temperature to about 600° C. (for depositing coating on LTO particles), and the operating pressure may be between about $7.5 \times 10^{-2}$ Torr and about 4 Torr (about 1 Pa to about 5000 Pa).

Because of the ALD process and surface reactions, a single atomic layer of the surface coating material may be bound to the electrode surface, thereby providing a monoatomic coating. With sequential or alternating reactions, composite layers may be formed. Furthermore, additional atomic monolayers may be grown over the monoatomic layer, thereby forming a surface coating having greater thicknesses.

Figure 3:
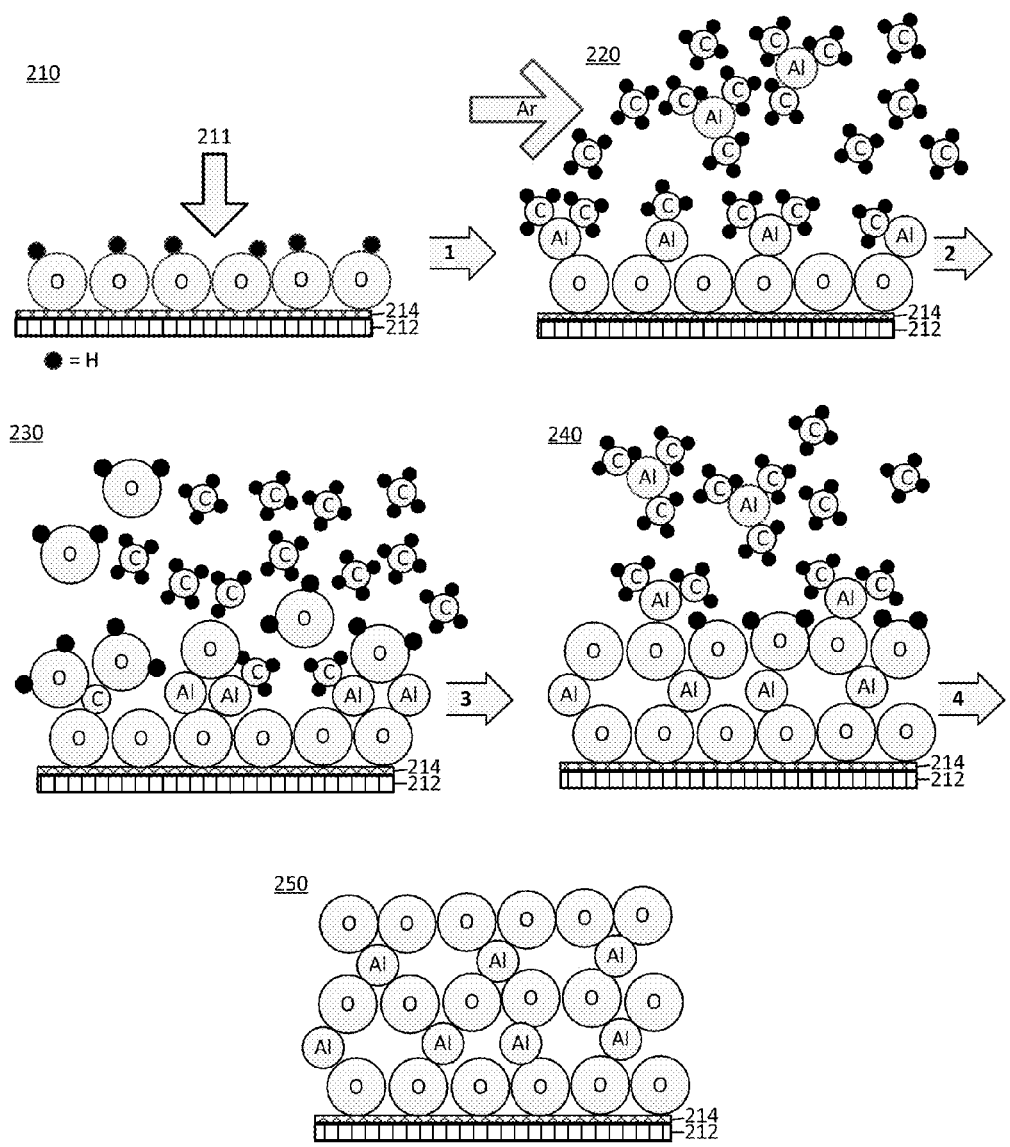
FIG. 3 is an exemplary schematic illustrating formation of aluminum oxide ($Al_2O_3$) coatings on an electrode material by an atomic layer deposition (ALD) process.

The ALD process can be illustrated by the formation of aluminum oxide ($Al_2O_3$) coatings on a graphite-based electrode material as in the illustrative process shown in FIG. 3. At step 210, an electrode material substrate 212 has a surface 214 that is first pretreated with oxygen plasma 211 or peroxide ($H_2O_2$) to form a plurality of hydroxyl groups (OH) on the surface. The presence of the hydroxide groups on surfaces of the electrode material substrate 212 provides suitable reactive species for the deposition of aluminum-containing species on preselected regions of the surface 214. The hydroxyl groups may be protected in an argon atmosphere and excess plasma 211 or peroxide may be removed by a flow of argon gas. The electrode material substrate 212 may then be placed in a suitable reaction chamber (not shown) to conduct a step-wise conformal coating process.

As shown in step 220, argon is introduced to the ALD chamber. A predetermined amount of aluminum, in the form of a suitable volatile precursor compound, such as trimethyl aluminum (TMA (($CH_3$)$_3$Al)), is introduced as a vapor (for example at a temperature of about 50° C.) and flows into contact with the exposed surfaces 214 of the electrode material substrate 212. Preferably, a stoichiometric excess of TMA to hydroxyl or reactive groups on the surface 214 is provided. The TMA chemisorbs to the oxygen/hydroxyl groups on the surface 214 of the electrode material substrate 212. Methane ($CH_4$) is released as a byproduct. Typically, reaction of the aluminum-containing material with the surface groups of electrode material substrate 212 is completed in a short time frame, on the order of a few seconds, for example.

Next, in step 230 water vapor ($H_2O$) is introduced into the reaction chamber to flow over the exposed surface 214 of electrode material substrate 212. The water ($H_2O$) further reacts with the TMA and forms methane ($CH_4$). As such, a first conformal layer of aluminum oxide ($Al_2O_3$) forms on the surface 214 of the electrode material substrate 212. Excess reactants and byproducts may be removed from the chamber. In step 240, TMA is introduced again to the chamber to form another layer of aluminum oxide. The ALD process in steps 220-240 are repeated to grow an $Al_2O_3$ film layer by layer on the surface 214 of the electrode material substrate 212. As generally shown in step 250, two atomic monolayers of $Al_2O_3$ are formed.

The ALD process is illustrative of one technique for forming aluminum oxide ($Al_2O_3$) coatings on an electrode material, but the process may also be used to form other coatings as well, by way of non-limiting example. For example, other oxide-based coatings or the secondary coating comprising a fluoride-based, carbide-based or nitride-based coating may be formed on the electroactive materials via an ALD process.

In certain aspects, the oxide-based coating may be selected from aluminum oxide ($Al_2O_3$), titanium oxide ($TiO_2$), silicon oxide ($SiO_2$), tin dioxide (SnO), vanadium pentoxide ($VnO_5$), hafnium dioxide ($HfO_2$), zirconium dioxide ($ZrO_2$), or zinc oxide (ZnO).

For an aluminum oxide ($Al_2O_3$) coating, a precursor may be selected from the group consisting of: trimethyl aluminum (TMA (($CH_3$)$_3$Al)), aluminum fluoride ($AlF_3$), aluminum nitride ((AlN) where the precursor is TMA and ammonia), and the like. In alternative variations, $Al_2O_3$ or any of the other coatings discussed herein can be readily obtained by using different precursors and deposition processes. For a titanium oxide coating ($TiO_2$), the precursor materials may be tetrakis(diethylamido)titanium(IV), tetrakis(dimethylamido)titanium(IV), and/or titanium(IV) isopropoxide, by way of example. For a vanadium pentoxide coating ($V_2O_5$), the metal precursor can be vanadium (V) oxytriisopropoxide, for example. For a zirconium oxide coating ($ZrO_2$), the precursors may be zirconium tetrachloride ($ZrCl_4$) and oxygen ($O_2$). For a hafnium oxide ($HfO_2$), the precursors may be tetrakis(ethylmethylamino)hafnium (TEMAH) and water. For a tin oxide (e.g., $SnO_2$) coating, the ALD precursor materials may be $SnCl_4$, $SnI_4$, Bis[bis(trimethyl silyl)amino]tin (II), Dibutyldiphenyl tin, Hexaphenyl ditin (IV) tetra-allyl tin, tetravinyl tin, trimethyl(phenyl)tin, tin acetylacetonate, or heterocyclic tin with hydrogen peroxide, ozone or water. For a zinc oxide coating (ZnO), the precursor material may be methylzinc isopropoxide. For a silicon oxide coating, the precursor materials can be silicon tetrachloride, tetraethyl orthosilicate, and/or tris(tert-butoxy)silanol, by way of example.

For a fluoride-based coating (used as the second coating disposed over the first coating), suitable precursor materials can be lithium fluoride (LiF), aluminum fluoride ($AlF_3$), and the like. For a nitride-based second coating, suitable precursor materials can be ammonia ($NH_3$), ammonium hydroxide ($NH_4OH$), titanium nitride (TiN), vanadium nitride (VN), aluminum nitride ((AlN) where the precursor is TMA and ammonia), and tungsten hexafluoride ($WF_6$), silicon tetrachloride ($SiCl_4$), or dichlorosilane ($SiH_2Cl_2$) combined with ammonia ($NH_3$), and the like. For a carbide-based second coating, suitable ALD precursor materials can be selected from tungsten carbide (WC) and silicon carbide (SiC).

In certain other alternative variations, an oxide-based surface coating can be synthesized on the electrode material by wet chemistry or sol gel processes, physical vapor deposition (PVD), chemical vapor deposition (CVD), chemical vapor infiltration, and other known conventional processes to apply such coatings to solid materials. For example, in a PVD process, such as magnetron sputtering, aluminum metal can be used as target, with a gas comprising argon and oxygen (Ar:$O_2$) used to sputter and deposit an $Al_2O_3$ coating on the pre-fabricated graphite electrode or alternatively graphite particles. In a thermal or CVD process, TMA at temperatures above 400° C. for thermal CVD and above about 200° C. can be used for plasma CVD deposition on the pre-fabricated graphite electrode or alternatively graphite particles, by way of example. Thus, applying the surface coating may comprise a deposition process including one or more coating precursor species to form an oxide-based surface coating, such as $Al_2O_3$, $TiO_2$, $SiO_2$, $VnO_5$, $SnO_2$, $ZrO_2$, or ZnO, by using a process selected from the group consisting of: ALD, CVD, PVD and wet chemistry.

As discussed above, the second coating applied to the oxide-based coating may comprise a fluoride-based, a carbide-based, and/or a nitride-based coating. In certain embodiments, the second coating is a fluoride-based surface coating, which may comprise a material selected from the group consisting of: aluminum fluoride ($AlF_3$), lithium fluoride (LiF), and combinations thereof. Such a fluoride-based surface coating may be formed by using one or more precursors for an aluminum fluoride ($AlF_3$) or lithium fluoride (LiF) coating applied to a surface of the lithium titanate, which as noted above, such precursors may also react with exposed reactive groups on the oxide-based coating to form additional species from the LiF or $AlF_3$, such as oxygen containing species, like $Li_2O$, by way of non-limiting example.

In various aspects, such a surface coating is applied by a non-aqueous deposition process. In certain aspects, the surface coating may be applied by a modified non-aqueous atomic layer deposition (ALD) process that can coat the LTO material with a conformal layer, for example, comprising aluminum fluoride ($AlF_3$) and/or lithium fluoride (LiF). While typical ALD coatings are applied with aqueous reactants, in certain aspects, the present disclosure provides methods for applying a surface coating to an electroactive material having an oxide-based coating disposed thereon via a non-aqueous ALD process that avoids use of any water within the deposition process. For example, in applying LiF via a non-aqueous ALD deposition process, the following precursors can be used to form the LiF based coating: $LiO^tBu$ and $TiF_4$. For applying $AlF_3$ via a non-aqueous ALD deposition process, the following precursors can be used to form the $AlF_3$ based coating: trimethylaluminum (TMA) and $TiF_4$.

The process can be illustrated by the formation of aluminum fluoride ($AlF_3$), but the process may also be used to form lithium fluoride, by way of non-limiting example. Moreover, in alternative variations, $AlF_3$ or LiF coatings can be easily obtained by using different precursors. For example, the fluoride (F) precursor can be $NiF_2$, $CaF_2$, $TiF_4$, $TiF_2$, $MgF_2$, $WF_6$ and/or active metallic fluorides (having a heating temperature above 160° C.).

In other alternative variations, a fluoride-based surface coating can be synthesized on the electroactive material by non-aqueous wet chemistry, non-aqueous sol-gel, physical vapor deposition (PVD), chemical vapor deposition (CVD) and other known conventional processes to apply such coatings to solid materials (without employing water). For example, in a PVD process, such as magnetron sputtering, $AlF_3$ can be used as target, with argon (Ar) as the gas to deposit an $AlF_3$ coating on the pre-fabricated LTO electrode or alternatively LTO particles. In a thermal or CVD process, TMA and $NF_3$ at temperatures above 400° C. for thermal CVD and above about 200° C. can be used for plasma CVD deposition on the electroactive material, by way of example.

Thus, in certain variations, the applying of the second surface coating can be conducted by a non-aqueous atomic layer deposition process with a precursor selected from the group consisting of: lithium fluoride (LiF), aluminum fluoride ($AlF_3$), titanium carbide (TiC), silicon carbide (SiC), titanium nitride (TiN), vanadium nitride (VN), aluminum nitride (AlN, where the precursor is TMA and ammonia), and the like. Thus, applying the second surface coating may comprise a non-aqueous deposition process including one or more coating precursor species to form a carbide-based surface coating, such as TiC, SiC, WC (for example, TiC can be formed by sputtering TiC target, or CVD with titanium tetrachloride and $CH_4$ as precursors), or a nitride-based surface coating, such as AlN, TiN, VN (TiN, sputtering Ti target with $N_2$, or CVD with titanium tetrachloride and $NH_3$ as precursors), by way of example.

In certain aspects, the present disclosure provides a surface coating formed on an LTO material that is formed from a precursor material selected from the group consisting of: lithium fluoride (LiF), aluminum fluoride ($AlF_3$), titanium carbide (TiC), silicon carbide (SiC), tungsten carbide (WC), titanium nitride (TiN), aluminum nitride (AlN), vanadium nitride (VN), and combinations thereof. In certain variations, the surface coating is a fluoride-based surface coating applied with a precursor material for a coating selected from the group consisting of: lithium fluoride (LiF), aluminum fluoride ($AlF_3$), and combinations thereof. In other variations, the surface coating applied is an oxyfluoride-based surface coating formed from a lithium fluoride (LiF) precursor material.

Other deposition processes may include applying one or more coating precursor species to form a carbide-based or nitride-based surface coating, such as SC, WC, AlN, TiN, VN, $Si_3N_4$, WN, TiN (sputtering Ti target with $N_2$, or CVD with titanium tetrachloride and $NH_3$ as precursors), by way of example.

Negative electrodes may comprise greater than or equal to about 50% to less than or equal to about 90% of an electroactive material (e.g., LTO or graphite particles), optionally greater than or equal to about 5% to less than or equal to about 30% of an electrically conductive material, and a balance binder. Suitable electroactive materials include those discussed previously above and may be the same as the electrically conductive materials, such as graphite. Electrically conductive materials also include carbon black, powdered nickel, metal particles, conductive polymers, or any combinations thereof. Useful binders may comprise a polymeric material and extractable plasticizer suitable for forming a bound porous composite, such as halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

An electrode may be made by mixing the electrode active material, such as graphite powder or particles, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove the remaining plasticizer prior to incorporation into the battery cell.

In certain preferred variations, pre-fabricated electrodes formed of electroactive material via the active material slurry casting described above can be directly coated via a coating formation process, such as in atomic layer deposition (ALD), or physical vapor deposition, or chemical vapor infiltration and the like. Thus, one or more exposed regions of the pre-fabricated negative electrodes comprising the electroactive material can be coated to minimize or prevent reaction of the electrode materials with components within the electrochemical cell and to minimize or prevent deposition of transition metals, such as manganese, on the surfaces of negative electrode materials (like graphite) when incorporated into the electrochemical cell. In other variations, a plurality of particles comprising an electroactive material, like LTO or graphite, can be coated with an oxide-based surface coating, followed by coating with the second coating (e.g., a fluoride coating). Then, the coated electroactive particles can be used in the active material slurry to form the negative electrode, as described above.

A battery may thus be assembled in a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

For example, in certain variations, an electrode membrane, such as an anode membrane, comprises the electrode active material (e.g., LTO or graphite) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

Example 1

Samples tested in a battery half-cell having a negative electrode material comprising $Li_4Ti_5O_{12}$ (LTO) are compared. A Control is a bare $Li_4Ti_5O_{12}$ (LTO) anode material (incorporated into a negative electrode). Sample A is an LTO material having an aluminum oxide ($Al_2O_3$) surface coating deposited thereon. Sample B is an LTO anode material having a fluoride-based (LiF) surface coating formed thereon. Sample C is also an LTO anode material having a different fluoride surface coating formed from $AlF_3$.

For Sample A, the LTO electrode material is coated with aluminum oxide ($Al_2O_3$) applied via a typical atomic layer deposition aqueous process. The $Al_2O_3$ layer is deposited at 180° C. with a trimethylaluminum (TMA, deposition grade, Sigma-Aldrich, USA) and high performance liquid chromatography grade $H_2O$ (Sigma-Aldrich, USA) as the precursors. A typical reaction for forming the coating is $2Al(CH_3)_3 + 3H_2O \rightarrow Al_2O_3 + 6CH_4$. An $Al_2O_3$ layer having a thickness of about 0.11 nm is deposited in each cycle on electrode surfaces (half inch in diameter). The total thickness of the oxide-layer surface coating formed is 2 nm after 20 cycles.

Sample B is formed by coating LTO material with lithium fluoride (LiF), which is applied via a non-aqueous atomic layer deposition at about 120° C. A fluoride-based surface coating comprising lithium fluoride is formed on the LTO by using a non-aqueous ALD deposition process with $LiO^tBu$ and $TiF_4$ as precursors in a similar process to that described above for Sample A. The surface coating thickness is around 2 nm after 20 cycles.

The surface of the LTO material is coated with aluminum fluoride ($AlF_3$) to form Sample C, which is applied via a non-aqueous atomic layer deposition (ALD) at about 120° C. For example, a typical reaction for coating the anode material in a non-aqueous ALD process is $3TiF_4 + 2Al(CH_3)_3 \rightarrow 2AlF_3 + 3TiF_2T\uparrow + 6CH_x\uparrow$. Thus, a second fluoride-based surface coating is formed over the oxide-based coating on the LTO. The second surface coating comprises aluminum fluoride ($AlF_3$). The surface coating thickness is around 20 nm.

Battery half cells with LTO (either Control or Samples A-C) as the working electrodes and Li foil as counter electrode are used with an electrolyte comprising 1M $LiPF_6$ in 50% EC and 50% DEC and a separator. The half-cell is stored at 55° C. for 100 hours having 100% state of charge (SoC). Gas output is measured and tested via gas chromatography-mass spectrometry (GC-Mass). Testing is conducted at the end of test to determine quantities of gas produced. Results are shown in Table 1 below.

TABLE 1

| Gas Species | Control Bare LTO (mass) | Sample A $Al_2O_3$ on LTO (mass) | Sample B LiF on LTO (mass) | Sample C $AlF_3$ on LTO (mass) |
|---|---|---|---|---|
| $H_2$ | 1 | 0.86 | 0.14 | 0.03 |
| CO | 0.13 | 1.54 | nd* <0.01 | nd* <0.01 |
| $CO_2$ | 1.02 | 2.58 | 1.57 | 0.24 |
| $CH_4$ | 0.01 | 0.01 | nd* <0.01 | nd* <0.01 |
| $C_2H_4$ | 0.06 | 0.01 | nd* <0.01 | nd* <0.01 |
| $C_4H_8$ | 0.05 | 0.07 | nd* | nd* |
| Total mass of all compounds | 10.27 mg | 10.11 mg | 9.24 mg | 9.14 mg |

*nd—not detectable (below detection limits).

As can be seen, as compared to the Control, each of Samples A, B, and C reduce the amount of gases formed, however, the fluoride coatings (Samples B and C) significantly suppress gas generation.

Example 2

In this example, two additional samples are prepared for purposes of comparison. Sample D is prepared in accordance with certain aspects of the present teachings and includes an LTO anode material having first an aluminum oxide ($Al_2O_3$) coating deposited on the LTO by ALD as described above in Example 1, followed by a fluoride surface coating formed from aluminum fluoride ($AlF_3$) deposited over the aluminum oxide coating deposited by a non-aqueous ALD process described above in Example 1. A thickness of the aluminum oxide coating is about 2 nm and a thickness of the aluminum fluoride coating is about 0.5 nm.

Sample E includes an LTO anode material having first an $AlF_3$ surface coating deposited directly onto the LTO via a non-aqueous ALD process described above in Example 1, followed by an aluminum oxide ($Al_2O_3$) coating deposited over the aluminum fluoride ($AlF_3$) via the above-described ALD process. A thickness of the aluminum fluoride coating is about 0.5 nm and a thickness of the aluminum oxide coating is about 2 nm.

A positive electrode and the surface-coated negative electrodes prepared as described (Samples A, C, D, E, and Control) are cut and incorporated as necessary into the half cell or full cell. An uncoated portion of the electrode is connected to an external tab. The electrolyte and separator are disposed between the surfaces of respective positive and negative electrodes to form a full-cell battery.

Electrochemical measurements are performed with the constant current density of 10 mA/g$^{-1}$ (about C/10) based on the mass of the positive electrode in the working voltage window of 3 V to about 4.8 V for full cells. A cycle test of the battery is performed. Charge discharge cycles are repeated 20 times at ambient conditions.

Figure 4:
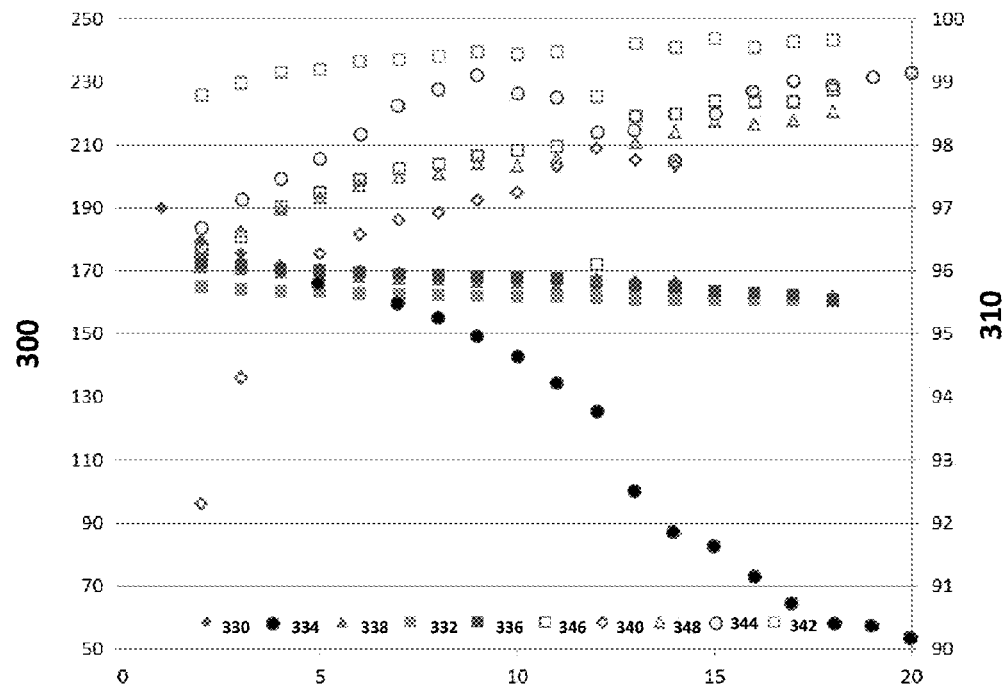
FIG. 4 shows specific discharge capacity (designated "300" in mA·h/g units) and Coulombic efficiency (designated "310" in %) over 20 discharge cycles (designated "320") for full cell comparative testing, including a sample prepared in accordance with certain variations of the present disclosure.

The charging and discharging profiles of the electrochemical performance of the Control and Samples A, C, D, and E are shown in FIG. 4. In FIG. 4, y-axis discharge capacity (300) is in mA·h/g units, y-axis Coulombic efficiency % (310), while cycle number is shown on the x-axis (320). A charge rate of C/10 is used and up to 20 cycles are tested. Charge capacity and discharge capacity are shown as solid data points (Control=330, Sample A=332, Sample C=334, Sample D=336, and Sample E=338) while Coulombic efficiency (CE) are shown as open data points (Control=340, Sample A=342, Sample C=344, Sample D=346, and Sample E=348).

Different coatings (e.g., Samples A and C) show different functionality. For example, as noted above in the context of Example 1, an aluminum fluoride coating over LTO (Sample C) suppresses gas generation. However, Sample A having aluminum oxide coating over LTO improves the cycle efficiency (having the best Coulombic efficiency and cycle stability). Sample D (having a protective coating system comprising the aluminum oxide coating adjacent the LTO and over coated with aluminum fluoride) demonstrates a high retention of discharge capacity, thus having good Coulomb efficiency and cycle stability. Moreover, the fluoride coating exposed on the surface further provides an advantage of reducing reactivity of the underlying LTO and metal oxide coating, which suppresses gas formation with an electrochemical cell over time, increasing storage stability and battery lifespan. While Sample E (having a protective coating system comprising the aluminum fluoride adjacent to the LTO over coated with the aluminum oxide coating) shows good discharge capacity levels and Coulomb efficiency, it is not believed to provide adequate suppression of gas generation, because the exposed metal oxide coating is exposed to the electrochemical cell environment. It is believed that the conformal metal oxide coating thus provides additional mechanical stability to the underlying electrode material, while the conformal fluoride coating is capable of protecting the underlying materials from reaction with other compounds present in the battery cell.

Figure 5:
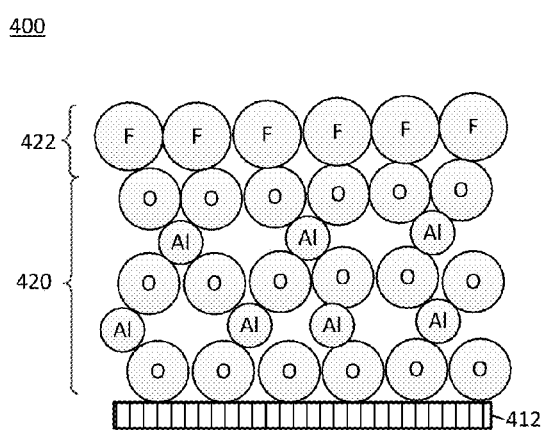
FIG. 5 shows an exemplary schematic illustrating a multifunctional hybrid protective coating system according to certain aspects of the present teachings comprising a first coating of aluminum oxide ($Al_2O_3$) and a second coating of fluoride formed on an electrode material by atomic layer deposition (ALD) processes.

FIG. 5 shows an exemplary embodiment of a hybrid coating system 400 for an electrode material 412. An oxide-based coating 420 comprises aluminum oxide molecules. A fluorine-based coating 422 comprises fluorine molecules. In certain variations, an oxide-based coating, such as $Al_2O_3$ provides good mechanical strength on the anode electroactive material surface (e.g., LTO surface) to mitigate the mechanical degradation by the presence of the surface coating. The ultrathin oxide-based coating may have a thickness of less than or equal to about 2 nm. The fluoride-based coating ($AlF_3$) deposited over the oxide-based coating provides good chemical stability against electrolyte to consume —OH functional groups and thereby suppress gas generation. The ultrathin fluoride-based top coat may have a thickness of less than or equal to about 0.5 nm. Thus, these experimental results generally indicate that ultrathin conformal multifunctional hybrid coating systems, comprising a metal oxide based coating and a fluoride coating deposited by ALD serve to improve the electrochemical performance anode materials in terms of charge capacity retention, cycle stability, and minimizing gas generation.

Example 3

Samples are prepared and tested in a battery half-cell having a negative electrode material comprising $Li_4Ti_5O_{12}$ (LTO) for comparison. An uncoated Control is a bare $Li_4Ti_5O_{12}$ (LTO) anode material (incorporated into a negative electrode). The Control is designated 430. Sample F is an LTO anode material having a fluoride surface coating formed from $AlF_3$, formed via a non-aqueous ALD process, as described above in Example 1. Sample F has a thickness of about 0.5 nm and is designated 432. Sample G is an LTO anode material having an aluminum oxide ($Al_2O_3$) surface coating deposited thereon via ALD as described in Example 1. Sample G has a thickness of about 2 nm and is designated 434. Sample H includes an LTO anode material having first an aluminum oxide ($Al_2O_3$) coating deposited over the LTO anode via the above-described ALD process in Example 1, followed by an $AlF_3$ surface coating deposited onto the aluminum oxide coating via a non-aqueous ALD process described in Example 1. A thickness of the aluminum fluoride upper coating is about 3-5 nm and a thickness of the aluminum oxide lower coating is about 20 nm. Sample H is designated 436.

Battery half cells with LTO (either Control or Samples F-H) as the working electrodes and Li foil as counter electrode are used with an electrolyte comprising 1M $LiPF_6$ in 50% EC and 50% DEC and a separator.

Electrochemical measurements are performed with the constant current density of 10 mA/g$^{-1}$ (about C/10) for the first three cycles and then at a current density of 3 mA/g$^{-1}$ (about C/10) rate cycling, based on the mass of the positive electrode in the working voltage window of 3 V to about 4.8 V for full cells. A cycle test of the battery is performed. Charge discharge cycles are repeated 30 times at ambient conditions.

Figure 6:
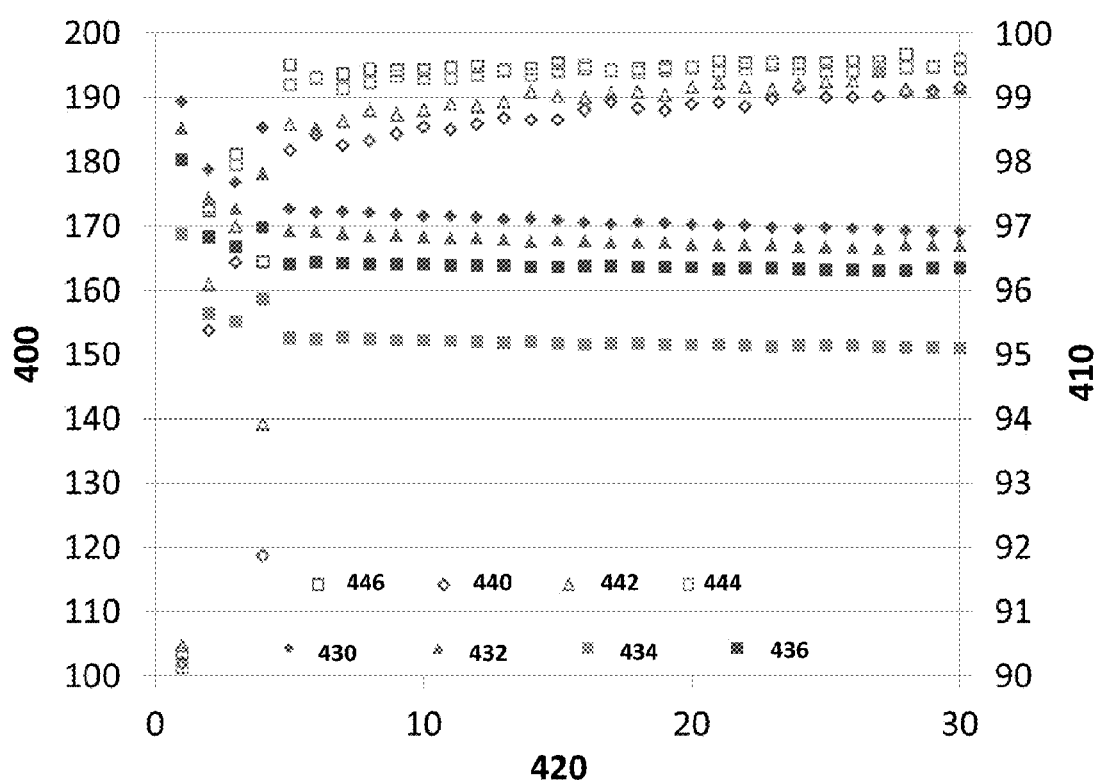
FIG. 6 shows specific discharge capacity (designated "400" in mA·h/g units) and Coulombic efficiency (designated "410" in %) over 30 discharge cycles (designated "420") for half cell comparative testing, including a sample prepared in accordance with certain variations of the present disclosure.

The charging and discharging profiles of the electrochemical performance of the Control and Samples F, G, and H are shown in FIG. 6. In FIG. 4, y-axis discharge capacity (400) is in mA·h/g units, y-axis Coulombic efficiency % (410), while cycle number is shown on the x-axis (420). A charge rate of C/10 is used for the first three cycles, followed by C/30 for the remaining 27 cycles tested. Charge capacity and discharge capacity are shown as solid data points (Control=430, Sample F=432, Sample G=434, and Sample H=436) while Coulombic efficiency (CE) are shown as open data points (Control=440, Sample F=442, Sample G=444, and Sample H=446).

All ALD-coated LTO anodes (Samples F-H) show better Coulombic efficiency and cycling stability than the uncoated LTO (Control (430)). The bilayer coating system (Sample H (436)) having an ALD $AlF_3$-top coating and ALD $Al_2O_3$-bottom coating adjacent the LTO material) improved cycling as compared to a single layer of $AlF_3$ found in Sample F (432). Moreover, the hybrid coating system of Sample (Sample H (436)) had better discharge capacity than the single layer of $Al_2O_3$ in Sample G (434).

Figure 7:
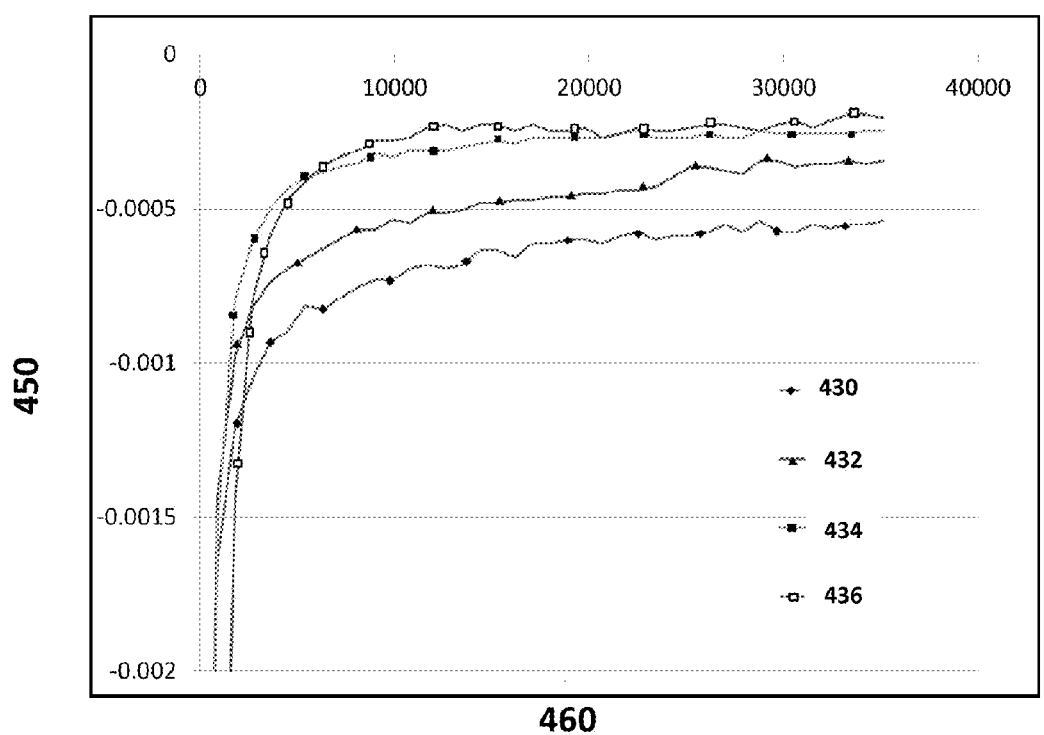
FIG. 7 shows current response (designated "450" in A/g units) during a voltage hold of 1 V versus time (designated "460" in seconds) for the samples shown in FIG. 6.

Comparison of the various ALD Coatings on LTO anodes (LTO versus Li) half-cell experiment are shown for the Control and Samples F-H in FIG. 7. As can be seen, small current responses (during a long voltage hold of 10 hours) indicates less chemical side reactions occur that degrade the cell. The hybrid bilayer coating system (Sample H (436)) having an ALD $AlF_3$-top coating and ALD $Al_2O_3$-bottom coating adjacent the LTO material) had the best results (lowest current), as compared to the single layer coatings of $Al_2O_3$ in Sample G (434) and $AlF_3$ in Sample F (432), as well as over the Control (430).

Therefore, in various aspects, the present disclosure provides an improved electrode material for an electrochemical cell, such as a lithium ion battery. The electrode material comprises an electroactive material. The electroactive material has a first oxide-based coating formed on one or more surface regions of the electroactive material. In certain variations, the first oxide-based coating is an ultrathin coating. A second coating is disposed over the first oxide-based coating. The second coating is distinct from the first oxide-based coating and is formed from a non-aqueous coating process. In certain variations, the second coating likewise has an ultrathin thickness. It should be noted that while the multifunctional hybrid coating system comprises the first oxide-based coating and the second coating in preferred variations, in alternative variations, other compositions or coatings may be also be included in the multifunctional hybrid protective coatings over the electrode in addition to the first oxide-based coating and the second coating.

The electroactive material may be selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof. In certain variations, the electroactive material comprises lithium titanate $Li_{(4+x)}Ti_5O_{12}$, where $0 \leq x \leq 3$ (LTO).

In certain variations, a thickness of the oxide-based coating is thus less than or equal to about 50 nm and a thickness of the second coating is less than or equal to about 50 nm. In certain other variations, the first oxide-based coating has a thickness of less than or equal to about 5 nm and the second coating has a thickness of less than or equal to about 50 nm. In other variations, a thickness of the oxide-based coating is less than or equal to about 15 nm and a thickness of the second coating is less than or equal to about 5 nm.

In certain aspects, the oxide-based coating comprises an oxide of a metal selected from the group consisting of: titanium (Ti), aluminum (Al), tin (Sn), zirconium (Zr), zinc (Zn) and combinations thereof. In other aspects, the oxide-based coating is selected from the group consisting of: aluminum oxide ($Al_2O_3$), silicon dioxide ($SiO_2$), tin dioxide ($SnO_2$), titanium dioxide ($TiO_2$), zirconium dioxide ($ZrO_2$), and zinc oxide (ZnO).

In certain other aspects, the second coating is selected from the group consisting of: a fluoride-based coating, a carbide-based coating, and a nitride-based coating. In yet other aspects, the second coating is a fluoride-based coating. Thus, in one variation, the oxide-based coating comprises aluminum oxide ($Al_2O_3$) and the fluoride-based coating is formed from a precursor material selected from the group consisting of: lithium fluoride (LiF), or aluminum fluoride ($AlF_3$), and combinations thereof. In one exemplary embodiment, a thickness of the oxide-based coating (e.g., aluminum oxide) is greater than or equal to about 1 nm and less than or equal to about 3 nm, for example, about 2 nm, and a thickness of the second coating (e.g., a fluoride-based coating) is less than or equal to about 0.5 nm.

Thus, the present disclosure contemplates a lithium ion electrochemical cell that comprises a negative electrode comprising the electrode material having the hybrid multifunctional coating system comprising an electroactive material having one or more surface regions coated with an oxide-based coating and a second coating disposed over the oxide-based coating that is formed via a non-aqueous deposition process. The lithium ion electrochemical cell further comprises a positive electrode, a separator, and an electrolyte that comprises a lithium salt. In certain aspects, the lithium ion electrochemical cell is capable of maintaining charge capacity for greater than or equal to about 500 hours of operation.

In certain variations, where the electroactive material comprises LTO for example, the inventive surface coating system is capable of suppressing greater than or equal to about 99.5% of gases that would otherwise be generated by a comparative LTO material lacking the surface coating. In certain aspects, the surface coating system according to the present teachings suppresses greater than or equal to about 99.7%, optionally greater than or equal to about 99.8%, optionally greater than or equal to about 99.9%, and in certain aspects, greater than or equal to about 99.99% of gases that would otherwise be generated by a comparative bare LTO material that lacks the inventive surface coating system.

In certain aspects, it is preferred that an electroactive material having a surface coating system according to the present disclosure for suppressing gas formation in an electrochemical cell, such as a lithium ion battery (e.g., for example comprising an LTO anode material) does not generate any or only minimal amounts of gaseous compounds during the life of the battery. For example, in certain aspects, an electrochemical cell or lithium ion battery comprising an electroactive material having a surface coating according to certain variations of the present disclosure is substantially free of gaseous compounds through the life of the electrochemical cell or battery. "Substantially free" is intended to mean that the compound is absent to the extent that it cannot be detected or that if the compound is present, it does not cause undue detrimental impact and/or prevent the overall use of the battery for its intended purpose. In some aspects, it is preferred that a concentration of gaseous compounds generated in the electrochemical cell is less than or equal to about 1,000 parts per million (ppm), optionally less than or equal to about 500 ppm, optionally less than or equal to about 100 ppm, optionally less than or equal to about 75 ppm, and in some preferred aspects, optionally less than or equal to about 50 ppm when the electrochemical cell or battery is stored over time. In some aspects, it is preferred that the gases generated correspond to less than or equal to about 0.1% of the sealed cell volume when the gas volume is evaluated at standard temperature and pressure (298 K, 1 atm) conditions, for example, after 100 hours of storage or more; optionally less than or equal to about 0.05% of the sealed cell volume; and in certain aspects, optionally less than or equal to about 0.01% of the sealed cell volume at standard temperature and pressure conditions.

In certain aspects, the lithium ion electrochemical cell incorporating an inventive electroactive material having a multifunctional hybrid surface coating system for suppressing gas formation and/or for minimizing formation of a solid electrolyte interface (SEI) layer to prevent or minimize capacity fade has a rate capacity of greater than or equal to about 0.05 C (C/20) to greater than or equal to about 20 Coulombs, where the lithium ion electrochemical cell is substantially free of gas generation for a standard lifetime of the electrochemical cell.

Thus, in certain variations, a method of improving performance in a lithium ion battery is provided. The method may comprise applying a multifunctional hybrid coating system to an electroactive material used in a first electrode in the lithium ion battery. The multifunctional hybrid coating system comprises an oxide-based coating adjacent to the electroactive material and a fluoride-based coating disposed thereon. The lithium ion battery further comprises a second electrode having an opposite polarity to the first electrode, a separator, and an electrolyte, and any of the electroactive material exposed to the electrolyte has the multifunctional hybrid coating system formed thereon.

The multifunctional hybrid coating system can minimize or prevent deposition of metals onto the electrode and/or minimize or prevent formation of a solid electrolyte interface (SEI) layer on the electrode to substantially maintain charge capacity during charging and discharging of the lithium ion battery for greater than or equal to about 1,000 cycles.

In certain variations, the electrode is a negative electrode and the electroactive material is selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof. In yet other variations, the electrode is a negative electrode and the electroactive material comprises lithium titanate $Li_{(4+x)}Ti_5O_{12}$, where $0 \leq x \leq 3$ (LTO) and the multifunctional hybrid coating system suppresses greater than or equal to about 99.5% of any gas species that would otherwise be generated by a comparative LTO electroactive material lacking the coating in a comparative negative electrode during charging and discharging of the lithium ion battery for greater than or equal to about 1,000 cycles. In certain other variations, the electrode may be a positive electrode. Thus, the electroactive material may be lithium manganese nickel oxide, which has particularly high voltages. The oxide-based multifunctional hybrid coating system can be used to mitigate mechanical degradation, while the fluoride-based coating can be used to suppress or minimize oxidation of the electrolyte.

Thus, in certain aspects, a method of minimizing or suppressing formation of gases and/or for minimizing formation of a solid electrolyte interface (SEI) layer to prevent capacity fade in a lithium ion battery may comprise applying a multifunctional hybrid coating system to an electroactive material. The electroactive material may be selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof. The multifunctional hybrid coating system comprises an oxide-based coating adjacent to the electroactive material and a fluoride-based coating disposed thereon. The lithium ion battery further comprises a positive electrode, a separator, and an electrolyte. Any of the electroactive material exposed to electrolyte has the protective multifunctional hybrid coating system formed thereon.

In certain variations, the electroactive material comprises lithium titanate $Li_{(4+x)}Ti_5O_{12}$, where $0 \leq x \leq 3$ (LTO) and the multifunctional hybrid coating system suppresses greater than or equal to about 99.5% of any gas species that would otherwise be generated by a comparative LTO electroactive material lacking the multifunctional hybrid coating system in a comparative negative electrode during charging and discharging of the lithium ion battery for greater than or equal to about 1,000 cycles. In other variations, the multifunctional hybrid protective coating system minimizes or prevents deposition of the metals onto the negative electrode and/or minimizes or prevents formation of a solid electrolyte interface (SEI) layer on the negative electrode to substantially maintain charge capacity during charging and discharging of the lithium ion battery for greater than or equal to about 1,000 cycles.

In certain variations, a lithium ion battery incorporating an inventive electroactive material having a multifunctional hybrid protective surface coating system for suppressing gas formation and/or for minimizing formation of a solid electrolyte interface (SEI) layer is substantially free of gaseous species for at least greater than or equal to about 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling). In certain variations, the lithium ion battery incorporating an inventive electroactive material having a surface coating system for suppressing gas formation and/or for minimizing formation of a solid electrolyte interface (SEI) layer is substantially free generated gaseous species for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years. Stated in another way, in certain aspects, a lithium ion battery or electrochemical cell incorporating the inventive electroactive material having a surface coating system for suppressing gas formation and/or for minimizing formation of a solid electrolyte interface (SEI) layer will be substantially free of gaseous species for at least 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

In other aspects, the present disclosure contemplates methods of making an electrode for an electrochemical cell. For example, such a method may comprise applying a first oxide-based coating via a deposition process to one or more surface regions of an electrode material. Then, a second coating is applied over the first oxide-based coating via a non-aqueous coating process. The second coating may be selected from the group consisting of: a fluoride-based coating, a carbide-based coating, and a nitride-based coating. The electroactive material may be selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof.

In certain variations, the first oxide-based coating has a thickness of less than or equal to about 50 nm and the second coating has a thickness of less than or equal to about 50 nm. In certain other variations, the first oxide-based coating has a thickness of less than or equal to about 5 nm and the second coating has a thickness of less than or equal to about 50 nm. In certain other variations, the non-aqueous coating process for applying the second coating is selected from the group consisting of: atomic layer deposition (ALD), physical vapor deposition (PVD), chemical vapor deposition (CVD), chemical vapor infiltration, non-aqueous wet chemistry, and non-aqueous sol-gel. In certain variations, the non-aqueous coating process for forming the second coating is a non-aqueous atomic layer deposition (ALD) process using a precursor selected from the group consisting of: lithium fluoride (LiF), aluminum fluoride ($AlF_3$), titanium carbide (TiC), silicon carbide (SiC), tungsten carbide (WC), titanium nitride (TiN), aluminum nitride (AlN), vanadium nitride (VN), and combinations thereof. The deposition process for applying the first oxide-based coating may be an atomic layer deposition (ALD) process that uses a trimethyl aluminum (($CH_3)_3Al$) precursor to form an aluminum oxide ($Al_2O_3$) coating on the electrode material and the second coating is a fluoride-based coating applied with a precursor material selected from the group consisting of: lithium fluoride (LiF), aluminum fluoride ($AlF_3$), and combinations thereof over the first oxide-based coating.

In certain aspects, the electrode material is contained in a pre-fabricated electrode layer and the oxide-based coating and the second coating are applied to at least one surface of the pre-fabricated electrode layer. In other aspects, the electrode material comprises a plurality of particles, so that the oxide-based coating and the second coating are applied to the plurality of particles that subsequently form the electrode. For example, the method may further comprise forming a negative electrode material after the applying of the first oxide-based coating and the second coating, by slurry casting the plurality of particles having the first oxide-based coating and the second coating with a plurality of carbon black particles and one or more polymeric binders.

Accordingly, electrode materials preparing in accordance with the present teachings can provide improved cycling performance when incorporated into lithium ion batteries, in terms of cycling stability, cycle life, and rate capability The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode for an electrochemical cell comprising:
   an electroactive material;
   a first oxide-based coating formed on one or more surface regions of the electroactive material; and
   a conformal second coating disposed over the entire first oxide-based coating, wherein the conformal second coating is distinct from the first oxide-based coating and is formed from a non-aqueous coating process.

2. The electrode of claim 1, wherein the first oxide-based coating comprises an oxide of a metal selected from the group consisting of: titanium (Ti), aluminum (Al), tin (Sn), vanadium (V), hafnium (Hf), zirconium (Zr), zinc (Zn) and combinations thereof.

3. The electrode of claim 1, wherein the first oxide-based coating is selected from the group consisting of: aluminum oxide, silicon dioxide, tin dioxide, titanium dioxide, vanadium pentoxide, hafnium dioxide, zirconium dioxide, and zinc oxide.

4. The electrode of claim 1, wherein the second coating is selected from the group consisting of: a fluoride-based coating, a carbide-based coating, and a nitride-based coating.

5. The electrode of claim 1, wherein the second coating is a fluoride-based coating.

6. The electrode of claim 5, wherein the first oxide-based coating comprises aluminum oxide.

7. The electrode of claim 1, wherein the electroactive material is selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof.

8. The electrode of claim 1, wherein a thickness of the first oxide-based coating is less than or equal to about 5 nm and a thickness of the second coating is less than or equal to about 50 nm.

9. The electrode of claim 1, wherein a thickness of the first oxide-based coating is less than or equal to about 15 nm and a thickness of the second coating is less than or equal to about 5 nm.

10. A lithium ion electrochemical cell comprising:
    the electrode of claim 1 used as a negative electrode;
    a positive electrode;
    a separator; and
    an electrolyte; wherein the lithium ion electrochemical cell is capable of maintaining charge capacity for greater than or equal to about 500 hours of operation.

11. A method of making an electrode for an electrochemical cell, the method comprising:
    applying a first oxide-based coating via a deposition process to one or more surface regions of an electroactive material; and
    applying a conformal second coating over the entire first oxide-based coating via a non-aqueous coating process, wherein the second coating is selected from the group consisting of: a fluoride-based coating, a carbide-based coating, and a nitride-based coating.

12. The method of claim 11, wherein the first oxide-based coating has a thickness of less than or equal to about 5 nm and the second coating has a thickness of less than or equal to about 50 nm.

13. The method of claim 11, wherein the non-aqueous coating process for applying the second coating is selected from the group consisting of: atomic layer deposition (ALD), physical vapor deposition (PVD), chemical vapor deposition (CVD), chemical vapor infiltration, non-aqueous wet chemistry, and non-aqueous sol-gel.

14. The method of claim 11, wherein the non-aqueous coating process is a non-aqueous atomic layer deposition process using a precursor selected from the group consisting of: lithium fluoride (LiF), aluminum fluoride ($AlF_3$), titanium carbide (TiC), silicon carbide (SiC), tungsten carbide (WC), titanium nitride (TiN), aluminum nitride (AlN), vanadium nitride (VN), and combinations thereof.

15. The method of claim 11, wherein the deposition process for applying the first oxide-based coating is atomic layer deposition (ALD) that uses a trimethyl aluminum (($CH_3)_3Al$) precursor to form an aluminum oxide coating on the electroactive material and the second coating is a fluoride-based coating applied with a precursor material selected from the group consisting of: lithium fluoride (LiF), aluminum fluoride ($AlF_3$), and combinations thereof.

16. The method of claim 11, wherein the electroactive material is a negative electroactive material selected from the group consisting of: lithium titanate $Li_{(4+x)}Ti_5O_{12}$, where $0 \leq x \leq 3$ (LTO), graphite, silicon, silicon-containing alloys, tin-containing alloys, and combinations thereof.

17. The electrode of claim 1, wherein the electroactive material is contained in a pre-fabricated electrode layer and the first oxide-based coating and the conformal second coating are applied to at least one surface of the pre-fabricated electrode layer and applied so as to cover the one or more surface regions of the electroactive material.

18. The electrode of claim 1, wherein the electroactive material is in the form of a plurality of particles.

19. The electrode of claim 1, further comprising a plurality of carbon black particles and one or more polymeric binders.

20. An electrode for an electrochemical cell comprising:
an electroactive material comprising lithium titanate $Li_{(4+x)}Ti_5O_{12}$, where $0 \leq x \leq 3$ (LTO);
a first oxide-based coating formed on one or more surface regions of the electroactive material that may contact an electrolyte or a solvent in the electrochemical cell; and
a conformal second coating disposed over the entire first oxide-based coating, wherein the conformal second coating is distinct from the first oxide-based coating and is formed from a non-aqueous coating process.

* * * * *